United States Patent [19]

Losq et al.

[11] Patent Number: 4,477,872
[45] Date of Patent: Oct. 16, 1984

[54] DECODE HISTORY TABLE FOR CONDITIONAL BRANCH INSTRUCTIONS

[75] Inventors: Jacques J. Losq, Palo Alto, Calif.; Gururaj S. Rao, Yorktown Heights; Howard E. Sachar, New Paltz, both of N.Y.

[73] Assignee: International Business Machines Corporation, Armonk, N.Y.

[21] Appl. No.: 339,561

[22] Filed: Jan. 15, 1982

[51] Int. Cl.³ .............................................. G06F 9/38
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,881,173 | 4/1975 | Larsen et al. | 364/200 |
| 3,940,741 | 2/1976 | Horikoshi et al. | 364/200 |
| 4,110,822 | 8/1978 | Porter et al. | 364/200 |
| 4,179,738 | 12/1979 | Fairchild et al. | 364/200 |
| 4,200,927 | 4/1980 | Hughes et al. | 364/200 |
| 4,370,711 | 1/1983 | Smith | 364/200 |
| 4,402,042 | 8/1983 | Guttag | 364/200 |

Primary Examiner—Raulfe B. Zache
Assistant Examiner—Mark P. Watson
Attorney, Agent, or Firm—Jack M. Arnold

[57] ABSTRACT

A method and apparatus predicting the outcome of a conditional branch instruction based on the previous performance of the branch, rather than on the instruction fields. The prediction of the outcome of a conditional branch instruction is performed utilizing a table that records the history of the outcome of the branch at a given memory location. A decode-time history table (DHT) is utilized. The DHT attempts to guess only the outcome of a conditional branch instruction, but not its target address. Thus, it can only be used to guess the branch outcomes at decode time when the target address is available. During the decoding of a conditional branch instruction, a table is accessed using the memory address of the branch instruction itself or some portions thereof. The table records the history of the outcomes of the branch at this memory location up to the congruence of the table size. A combinational circuit determines the guess (taken or not taken) from the branch history as provided by the table.

4 Claims, 5 Drawing Figures

DECODE HISTORY TABLE FOR CONDITIONAL BRANCH INSTRUCTIONS

TECHNICAL FIELD

The invention is in the field of data processing, and specifically is directed to branch instruction predictions. More specifically, the invention is directed to method and apparatus for improving the guess accuracy for conditional branch instruction outcomes in a computing system.

BACKGROUND ART

In most pipeline processors, conditional branch instructions are resolved in the execution (E) unit. Hence, there are several cycles of delay between the decoding of a conditional branch instruction and its execution/resolution. In an attempt to overcome the potential loss of these cycles, the decoder guesses as to which instructions to decode next. Many pipeline processors classify branches according to the instruction field. When a branch is decoded, the outcome of the branch is predicted, based on its class.

In known computing systems, the reduction of branch penalty is attempted through the use of history focussed on instruction prefetching. Branch history tables (BHT) utilize the address of the instruction stream being prefetched for accessing a table. If a taken branch were previously encountered at that address, the table indicates so and, in addition, provides the target address of the branch on its previous execution. This target address is used to redirect instruction prefetching because of the likelihood that the branch will repeat its past behavior. The advantage of such an approach is that it has the potential of eliminating all delays associated with branches. There are, however, delays due to incorrect prediction of branches and delays due to cache access time for branch targets. The size of the BHT needs to be fairly large to reach a guessing accuracy on the order of 80%. The table has to contain a large number of entries to approach such accuracy, particularly for commercial environments. In addition the entries are wide, because they include a match field for comparison with the instruction address (used to access the table) and the full target address.

There are several instruction prefetching mechanisms known in the art, each having certain advantages and disadvantages. U.S. Pat. No. 3,559,183 to Sussenguth, which patent is assigned to the assignee of the present invention, sets forth an instruction prefetching mechanism utilizing a BHT. There is apparatus for recognizing the occurrence of a particular instruction in a stream of instructions and then modifying that stream of instructions. A fetch register for receiving instructions from a main memory is provided. A prefetch sequence control register containing the address of a particular instruction, as well as the address of the next instruction to be fetched is also provided. The comparison is continuously made between the instruction address in the fetch register and in the prefetch sequence control register. Upon noting an equality between these two, the second address from the prefetch sequence control register is transferred to the fetch register and the instruction extracted from memory. Means are also provided for inhibiting this operation and providing an address from a related register to the fetch register upon the occurrence of an equality between the address in the prefetch sequence control register and another related register.

U.S. Pat. No. 4,200,927 to Hughes et al, which patent is assigned to the assignee of the present invention, sets forth a multi-instruction stream branch processing mechanism which predicts outcomes of additional branch instructions based on the instruction field.

U.S. Pat. No. 3,940,741 to Horikoshi et al sets forth an information processing device for processing instructions including branch instructions. A route memory is provided for storing branch target addresses of a plurality of branch instructions and branch target instructions in corresponding relationship to the branch target addresses, and the route memory is referenced by the address in a given instruction, whereby the branch target instruction at the corresponding branch target address is read out. That is, the Horikoshi et al patent utilizes the address of the target of the branch instruction for prediction purposes. Since a plurality of different branch instructions may have the same branch target address, it is seen that the prediction of the outcome of a given branch instruction may be based on the outcome of a different branch instruction.

According to the present invention, a method and apparatus of predicting the outcome of a conditional branch instruction based on the previous performance of the branch, rather than on the instruction field is set forth. That is, the prediction is based on the address of the branch instruction itself, and not on the address of the target of the branch instruction. The prediction of the outcome of a conditional branch instruction is performed utilizing a table that records the history of the outcome of the branch at a given memory location. A decode-time history table (DHT) is utilized rather than a branch history table (BHT). The DHT attempts to guess only the outcome of a conditional branch instruction, but not its target address. Thus, it can only be used to guess the branch outcomes at decode time when the target address is available. During the decoding of a conditional branch instruction, a table is accessed using its memory address or some portion of the branch instruction itself. The table records the history of the outcome of the branch at this memory location up to a congruence of the table size. A combinational circuit determines the guess (taken or not taken) from the branch history as provided by the table. A simple version of this mechanism is to remember only the last outcome of every branch location. In this case, the output from the table is directly used as the guess. If the table indicates the branch was taken or fell through the last time, the prediction is to guess the branch successful or unsuccessful, respectively. The table is updated to always reflect the branch outcomes on their last execution. The table is initialized to provide a default guess. In contrast to the BHT, the DHT is accessed during the decode-cycle of the instruction (stage II of FIG. 1) and predicts only the branch outcomes (not target address). It is intended only to increase branch guessing accuracy, not to provide the address of targets for prefetching.

BREIF DESCRIPTION OF THE DRAWINGS

DISCLOSURE OF THE INVENTION

A computing system is set forth, including method and apparatus for predicting the outcome of a given conditional branch instruction. Each conditional branch instruction is decoded, and a decode-time history table is accessed during the decode-cycle of an instruction, utilizing at least a portion of the memory address of the branch instruction itself, wherein the decode-time history table records the history of the outcome of each conditional branch instruction at its respective memory location. The decode-time history table is updated to reflect each conditional branch outcome at their previous executions. The outcome of a given conditional branch instruction is predicted based on whether the given branch instruction was or was not taken on its previous executions as recorded in the decode-time history table, when accessed during the decode-cycle.

BEST MODE OF CARRYING OUT THE INVENTION

Figures 1, 2:
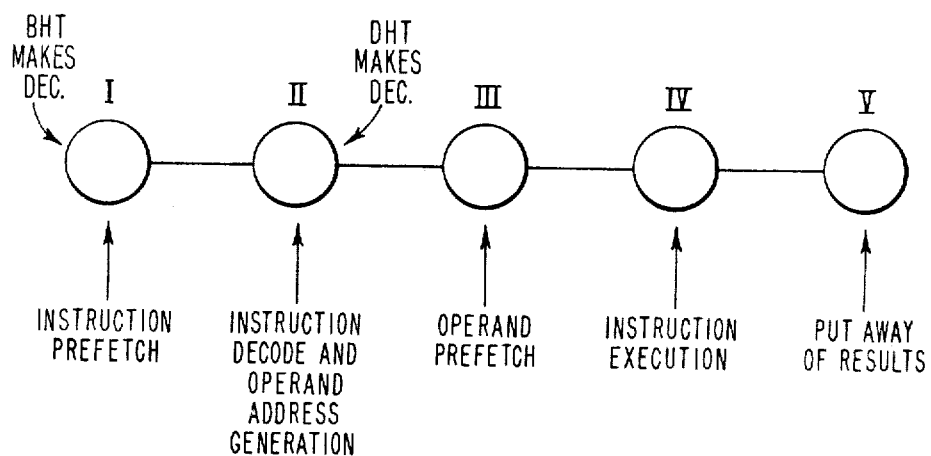
FIG. 1 is a flowchart illustrating the major instruction processing steps for a high performance central processing unit.
FIG. 2 is a table entry for an instruction prefetch for a branch history table.

The conceptual distinction between a DHT according to the present invention, and a BHT, as described in U.S. Pat. No. 3,559,183, will be briefly described. Only the most important distinctions between the two tables are illustrated. As shown in FIG. 1, the major instruction processing steps in high performance central processing units (CPUs) are instruction prefetch (stage I), instruction decode and operand address generation (stage II), operand prefetch (stage III), instruction execution (stage IV), and put away of results (stage V). CPUs that make use of branch history through a BHT detect the possible presence of a previously executed taken branch instruction in an instruction double word that is about to be prefetched (stage I). This is done by accessing the BHT with the instruction prefetch address (address of the instruction double word that is being prefetched). A table entry has two parts: instruction double word address and the (double word) address for the target of a taken branch within the double word, if any, for the previous use of that double word, as illustrated in FIG. 2. If the address of the instruction double word that is being prefetched is present in the table, the table delivers the associated target address in the table to the instruction prefetch unit. This address is used to prefetch the next instruction double word on the assumption that the branches behave the same (taken or not) as the previous execution of the same branches. That is, BHT predicts the target address as well as the outcome of branches (conditional as well as unconditional) in stage I, before the branch is detected (decoded) in stage II. In contrast, the contents of the DHT are different, it predicts only the outcome of conditional branches after the branch is detected (decoded) in stage II. This will be described in detail relative to FIGS. 3-5.

Figure 3:
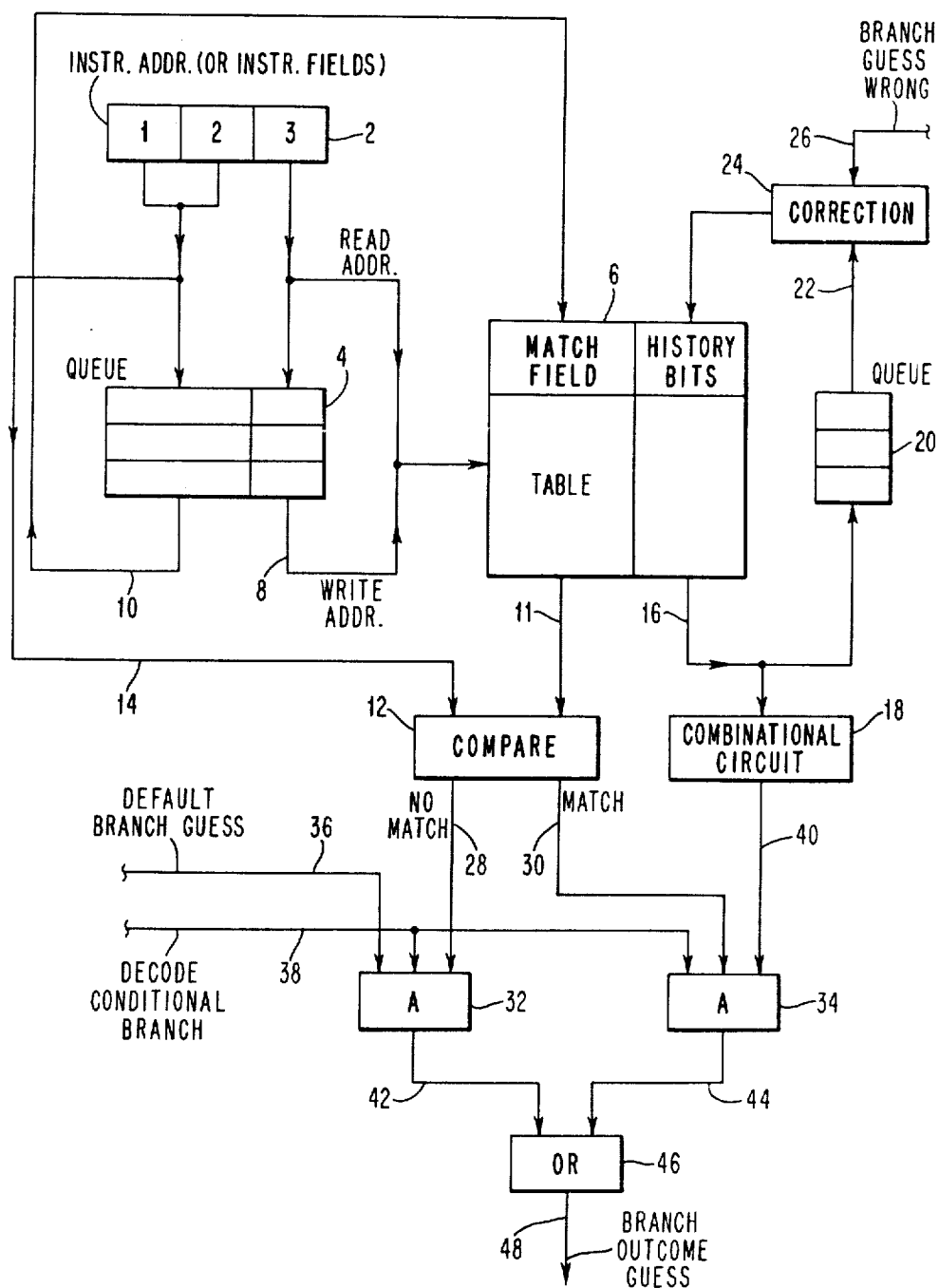
FIG. 3 is a block diagram of a decode history table.

Refer now to FIG. 3 which is a block diagram representation of the DHT according to the present invention. An instruction address register 2 contains the conditional branch instruction address presently being decoded. This register is initialized from the program memory (not shown) and subsequently updated to show the address of the instruction being decoded. For purposes of description only, the address is three bytes wide with the first and second bytes (match field) being provided to the left portion of an address Queue 4, and byte 3 (DHT read address), being provided to the right most portion of the Queue 4 and as a read address to history table 6. The address Queue and table 6 may be any standard storage device, for example, registers. The table 6, for purposes of this example only, will be considered a 256 entry table. The address Queue 4 will have enough stages such that the address at the bottom of the Queue will correspond to the branch address currently being executed. A WRITE ADDRESS signal is provided on line 8 to table 6, and a MATCH FIELD signal is provided via line 10 to table 6 to update a conditional branch instruction presently being executed. In practice the match field may have zero bits in which case the left portion of Queue 4, left portion of table 6, COMPARE circuit 12, AND gate 32, OR gate 46, and lines 42, 10, 11, 28, 30, 14 are eliminated. Line 44 becomes the BRANCH OUTCOME GUESS. These simplifications also apply to FIGS. 4 and 5.

The table 6 is comprised of a match field portion and a history bits portion, with the output of the match field on line 11 being provided to the first input of a compare unit 12. The match field portion, that is bytes 1 and 2 of the instruction address register are provided via a line 14 to the second input of the compare unit 12. The history bits from the table 6 are provided via line 16 to a combinational circuit 18 and to history Queue 20, which Queue may be comprised of any storage type device such as a register. The output of the history Queue is provided via line 22 to a first input of a correction network 24 which has a BRANCH GUESS WRONG signal provided on line 26 from the execution unit (not shown).

A NO MATCH signal and a MATCH signal are provided via lines 28 and 30 to AND gates 32 and 34 respectively from the compare unit 12. The AND gate 32 has a DEFAULT BRANCH GUESS signal provided on line 36 from the instruction decode unit (not shown) to a second input thereof. A DECODE CONDITIONAL BRANCH signal is provided from the instruction decode unit (not shown) as a gating signal to the third input of AND gate 32 and the second input of AND gate 34. The third input to AND gate 34 is from the output of combinational circuit 18 via line 40. The signal outputs from AND gates 32 and 34 are provided on line 42 and 44 respectively to first and second inputs of an OR gate 46 with the output of the OR gate 46 being provided via line 48 as the BRANCH OUTCOME GUESS signal to the instruction fetch unit (not shown) to predict the outcome of the conditional branch instruction being decoded.

The address Queue 4 and history Queue 20 are first in first out Queues and contain information related to conditional branch instructions that have been successfully decoded by the instruction unit but as yet have not finished execution. Information enters these Queues at one end, and shifts one position down every cycle it can without overriding information at a lower position. Information at the bottom of the Queue is removed when the associated conditional branch is resolved, typically in the E unit. The number of positions in these Queues is the number of undecided (unresolved) conditional branch instructions the I unit can successfully decode. As previously set forth, the queues can be composed of any storage device such as registers.

The table 6 entry has two sections, the history section records the history of a conditional branch instruction, whose instruction address maps to that entry; and the match field section which contains the instruction address bits not used in the mapping when the entry was made in the table. It is also possible to keep only some or none of the bits of the latter in the match field of the table. When an entry address is given to the table and a read access is made, the match field and the history bits in the entry are read out. The number of match field and history bits is an implementation decision and does not effect the operation of the device. The simplest history to keep and use is one bit, wherein a binary ONE indicates a taken branch, and a binary ZERO a not taken branch. For the implementation shown, it is assumed for convenience that the table can be accessed twice in cycle: the first half of the cycle for a READ ACCESS for prediction, and the second half of the cycle for a WRITE ACCESS for correction.

For simplicity of the detailed description which is to follow, all conditional branches are assumed to use the DHT. If only a subset of conditional branches that are guessed use the DHT, those that use the DHT need to be marked by the instruction unit so that the DHT is not corrected if a branch that does not use the DHT is guessed incorrectly. Again, the match field may be zero bits wide.

All the actions to be described occur during every cycle particularly in a cycle in which a conditional branch instruction is decoded. If an instruction takes more than one cycle to decode, these actions are repeated in each cycle. The least significant bits of the instruction address are used to provide an entry address in the table 6. It is possible to use complex mapping algorithms to map the instruction address on to the entry address in the table. A READ ACCESS is made to the table at the entry address, and history bits and the match field at the entry address are read out. The instruction address bits not used in forming the entry address are compared with the match field bits. If they match then the history bits are used to provide the branch outcome prediction (branch guess) determined by the combinational circuit 18 using the history bits just read out of the table 6. In the simplest case (one bit history), the branch is guessed to do what the history bit indicates it did previously. If there is no match, the use of a default branch guess is optional, as will be described in more detail shortly. If a conditional branch instruction is successfully decoded during this cycle, the branch guess is used to predict the outcome of the branch; additionally the history bits are set at the top of the history queue 20 and the instruction address bits in bytes 1, 2 and 3 of the instruction address register 2 are set at the top of Queue 4 for subsequently writing into table 6 for recording the history of the branch just decoded. If a conditional branch is not decoded or no instruction was successfully decoded, no queues are set and the branch guess is not used. The branch outcome guess is used as in any other pipeline machine that guesses the outcome of conditional branches at decode time of the branch (for example, the machine described in U.S. Pat. No. 4,200,927).

When a conditional branch is about to be resolved, (typically in the execution phase) the bottom position of the address queue 4 contains its instruction address and the bottom of the history queue 20, contains the history bits read out of the table 6 when the branch was decoded. All the actions described in this paragraph take place in the cycle in which the conditional branch is resolved. The correct history of the branch just resolved is first recorded: the instruction address in the bottom of the queue 4 is used to generate the WRITE entry address in the DHT using the same process for READ accesses at decode time. The bits not used in the entry address become a match field for this entry in the table. The history bits in the bottom of the queue 20 are corrected by the correction unit 24 if needed. The corrected history bits and the match field are written at the WRITE entry address in the table. If the branch guess is wrong the normal processing of guess-wrong branches takes place in the execution unit. In addition, the Queues 4 and 20 are cleared (reset). If the branch guess is correct, in addition to the normal branch processing in the execution unit, the Queues 4 and 20 are shifted one position down so that the Queue information related to the correctly guessed branch just resolved is removed from the Queues.

In an implementation that allows only one access to the table in a cycle (Read or Write) correction of the table is given priority over the READ ACCESS for prediction. In this case, either the decoding of a conditional branch and correction cycle is prohibited, or the decoding is allowed but the branch is neither guessed by the DHT nor entered in the Queues 4 or 20.

Consider now a detailed description of operation of one cycle of operation of the decode history table. The address of the conditional branch instruction presently being decoded is stored in the instruction address register 2. The three bytes of the instruction address are shifted into the top of the address Queue 4, with bytes 1 and 2 (the match field) also being provided to one input of the compare network 12 and the third byte, that is the read entry address, being applied to the match field section of the table 6 to read out the address and associated history information. The read out address information is provided via line 11 to the other input of the compare unit 12, and the history bits are provided via line 16 to the combinational circuit 18, and to the top of the history Queue 20. The combinational circuit 18 combines the history bits on line 16 to form a branch outcome guess bit on line 40 based on an algorithm that is dependent on implementation. Some specific algorithms are described later for the sake of illustration. If the first two bytes from the instruction address register 2 match the two bytes in the match field of the table 6 as manifested on line 11, the compare network 12 provides a binary ONE signal to the first input of the AND gate 34. Since the instruction is being decoded at this time, the DECODE CONDITIONAL BRANCH gating signal on line 38 is also at a binary ONE level such that the AND gate 34 passes the branch outcome guess bit formed on line 40 by the combinational circuit 18. If the branch was taken at the last time the instruction was executed the signal on line 40 is a binary ONE, and on the other hand if the branch was not taken, the signal is a binary ZERO. Accordingly, OR gate 46 passes the guess bit on line 40 to output line 48 as a BRANCH OUTCOME GUESS signal to the instruction fetch unit. If the guess bit was at a binary ONE level, the instruction unit fetches the branch target instruction stream, and if it was at a binary ZERO level, the branch target instruction stream is not fetched.

Consider the situation when it is system initialization time, or the instruction address in register 2 does not match any of the addresses in table 6. In this instance, the NO MATCH signal on line 28 from the compare unit 12 is at a binary ONE level. If a conditional branch instruction is in fact being decoded, the DECODE CONDITIONAL BRANCH signal on line 38 is also at a binary ONE level. If there is a DEFAULT BRANCH GUESS signal provided on line 36 by another unit in the computer, this signal is then provided via line 42 to the OR gate 46 for provision to the instruction fetch unit as the BRANCH OUTCOME GUESS signal. It is seen that if there is no DEFAULT BRANCH GUESS signal on line 36, there is a ZERO output on line 42 from the AND gate 32 and the BRANCH OUTCOME GUESS signal is a binary ZERO and the branch target instruction stream is not fetched. This is equivalent to guessing the branch to be not taken on such branch instructions.

In the second half cycle of operation the WRITE entry ADDRESS on line 8 from the bottom of the address Queue 4 is applied to the table 6 for gating in the match field of the branch instruction currently being executed (which is at the bottom of the Queue), such that it is provided on line 10 to the match field section of the table 6 for storage at the WRITE entry address thereof. Concurrently the history bits for this instruction address are read out of the bottom of history queue 20 to correction network 24. If the BRANCH GUESS WRONG signal on line 26 is at a binary ONE level, which indicates a wrong guess on the branch instruction being executed, the history bits on line 22 are corrected by the correction network 24 for provision to the history bit section of table 6 at the WRITE entry address. The correction action at 24 is dependent on the algorithm used for combining the history bits at combinational circuit 18 and thus is implementation-dependent. Specific correction action for 24 is described later for illustration purposes. On the other hand if the branch guess is correct, (binary ZERO level), the history bits on line 22 are not corrected for provision to the history bit section of table 6.

Figure 4:
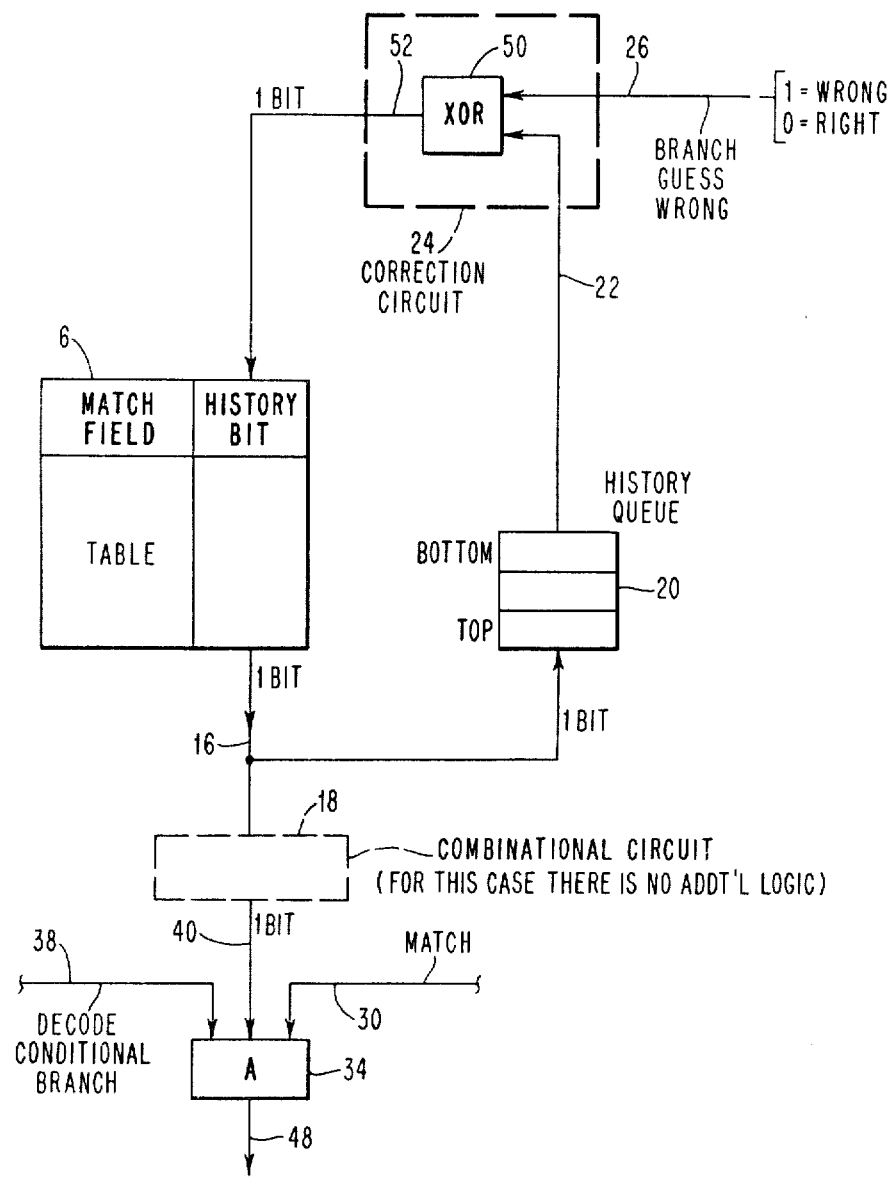
FIG. 4 is a more detailed block diagram representation of the combinational and correction circuits of FIG. 3 for a decode history table with a one bit history.

Refer now to FIG. 4 which illustrates a portion of the decode history table when the history is one bit wide. The combinational circuit 18 in this instance would be a straight line connection from line 16 to line 40 for provision to the AND gate 34. As previously indicated, when a conditional branch instruction is being decoded the DECODE CONDITIONAL BRANCH signal on line 38 is at a binary ONE level and the MATCH signal on line 30 is at a binary ONE level if the address in the instruction address register 2 (of FIG. 3) matches the match field in the table 6, with the history bit then being passed to output line 48 for provision to the instruction fetch unit as the BRANCH OUTCOME GUESS signal.

In the instance when the history bit is one bit wide, the correction circuit 24 is comprised of an EXCLUSIVE OR gate 50. The signal on line 22 is reproduced at the output 52 of the EXCLUSIVE OR gate 50 whenever the branch guess is correct, that is when 26 is at a binary ZERO level, and the signal on line 22 is inverted whenever the branch guess is wrong as indicated by a binary ONE signal on line 26. The bit on line 52 is used to update the history of the conditional branch instruction just executed, as previously set forth.

Figure 5:
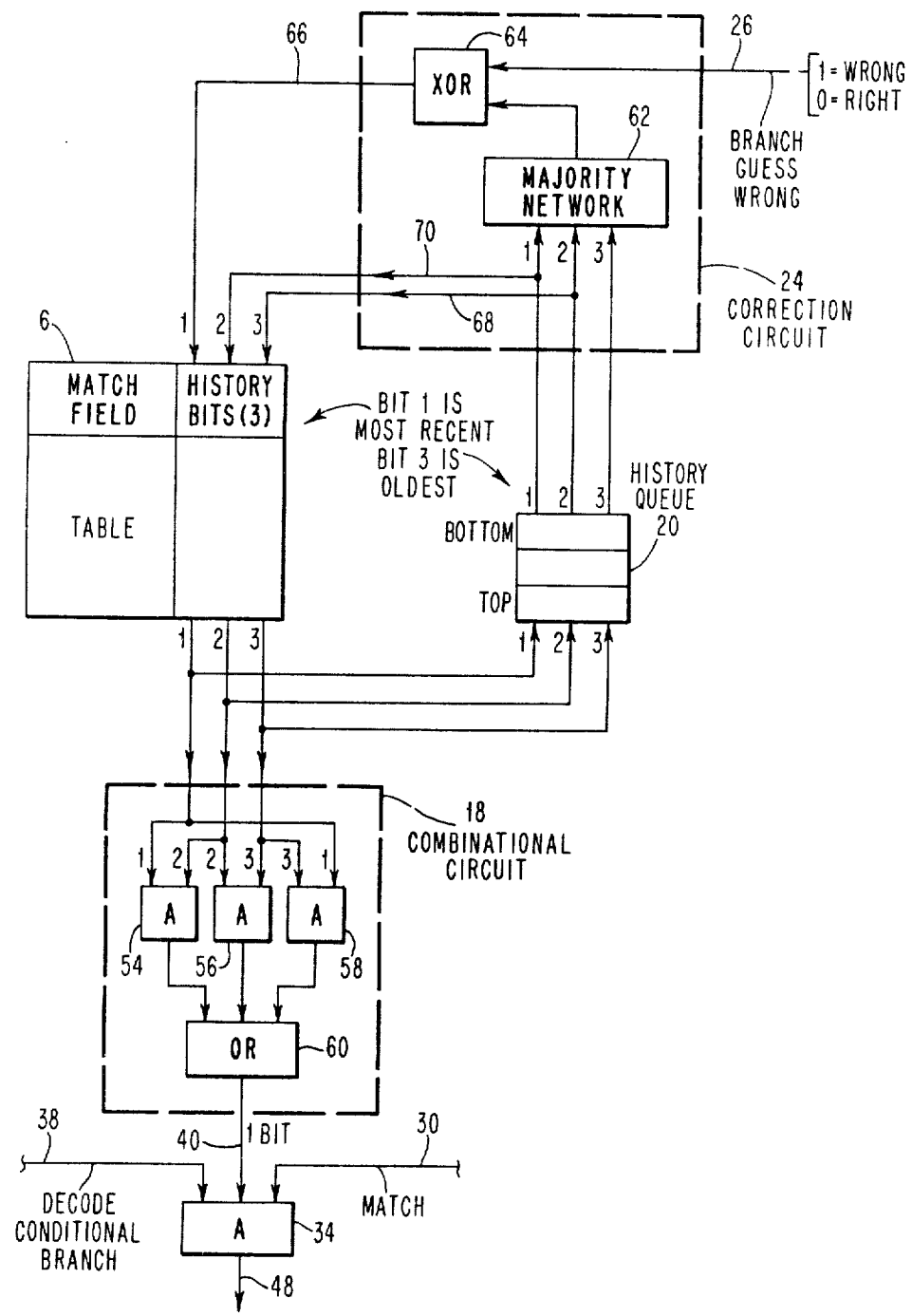
FIG. 5 is a more detailed block diagram representation of the combinational and correction circuits of FIG. 3 for a decode history table with a three bit history.

Refer now to FIG. 5 which illustrates the table 6 including a three bit history, and the combinational circuit 18 and correction circuit 24 to implement a three bit history. In table 6 the three bits, 1, 2 and 3 are illustrated with bit 1 being the most recent history bit and bit 3, being the oldest history bit. The three history bits are provided via a bus 16 (of FIG. 3) to the combinational circuit 18 and the history queue 20.

For a three bit history the combinational circuit 18 is comprised of a majority network which includes AND gates 54, 56 and 58 and an OR gate 60. A majority network operates such that if any two of the three history bits are at a binary ONE level, the combinational circuit 18 provides a binary ONE signal on line 40 which is indicative that the branch should be guessed to be taken. On the other hand, if less than two of the three history bits are at a binary ONE level, the combinational circuit 18 provides a binary ZERO on line 40 which is indicative that the branch should be guessed to be not taken.

AND gate 54 receives history bits 1 and 2 at its respective inputs, AND gate 56 receives history bits 2 and 3 at its respective inputs and AND gate 58 receives history bits 1 and 3 at its respective inputs. If either of these AND gates have both inputs at a binary ONE level it provides a binary ONE output signal to the OR gate 60 which passes the binary ONE signal as a branch outcome guess bit to the AND gate 34, the operation of which has been previously explained.

The history Queue, in the second half cycle of operation provides the three history bits from the bottom of the Queue to the correction network 24, which includes a majority network 62 therein which functions in the same manner as the majority network in the combinational circuit 18. That is, if any two of the three history bits are at a binary ONE level a 1 bit binary ONE signal is provided at the output of the majority network 62 to a first input of an EXCLUSIVE OR gate 64, which has provided to the second input thereof the BRANCH GUESS WRONG signal on line 26. The EXCLUSIVE OR gate 64 operates in an identical fashion to the EXCLUSIVE OR gate 50 described in FIG. 4. That is, the output signal from the majority network 62 is not inverted by the EXCLUSIVE OR gate 64 if the BRANCH GUESS WRONG signal indicates the guess is correct, that is, at a binary ZERO level, and is inverted if the BRANCH GUESS WRONG signal indicates the guess is incorrect, that is, at a binary ONE level. This updated most recent history bit is provided via line 66 to the bit 1 position of the history bit portion of table 6. The history bit 2 from history queue 20 is provided via line 68 to the history bit position 3 of table 6, and history bit position 1 from history queue 20 is provided via line 70 to history bit position 2 of table 6. It is seen, therefore, that history bits 1 and 2 from history queue 20 are shifted such that they become bits 2 and 3 respectively in table 6 and the most recently corrected history bit on line 66 becomes history bit 1 in table 6.

In summary, a conditional branch instruction prediction method and apparatus utilizing a DHT has been set forth in which the prediction of whether a conditional branch instruction is taken or not is based on the address of the branch instruction itself, and not on the address of the target of the branch instruction.

INDUSTRIAL APPLICABILITY

It is an object of the invention to provide an improved conditional branch instruction handling method and apparatus for instruction fetching following the branch instruction.

It is another object of the invention, to provide an improved conditional branch instruction handling method and apparatus wherein the prediction is based on the address of the branch instruction itself.

It is yet another object of the invention to provide an improved conditional branch instruction handling method and apparatus in which the outcome of a conditional branch instruction is based on the previous performance of the branch, rather than on the instruction field.

It is still another object of the invention to provide an improved conditional branch instruction handling method and apparatus in which the prediction of the outcome of the conditional branch instruction is performed utilizing a table that records the history of the outcome of the branch at a given memory location.

Having thus described our invention, what we claim as new, and desire to secure by Letters Patent is:

1. In a computing machine, apparatus for predicting the outcome of conditional branch instructions, the combination comprising:

an address queue in which the addresses of conditional branch instructions that have been successfully decoded, but have not finished being executed are stored;

an address and history table in which at least a portion of the addresses of conditional branch instructions are stored, including at least one stored history bit associated with each of said conditional branch instructions which is indicative of whether or not the previous executions of the associated conditional branch instruction resulted in a branch being taken;

an instruction address register in which the address of a given conditional branch instruction is stored during the instruction decode cycle, wherein said address contains a match portion and a read portion, including means for transferring said address of said given conditional branch instruction to said address queue, and applying said read portion to said address and history table for reading out said at least a portion of the address of said given conditional branch instruction and its associated said at least one history bit;

a compare network which has the match portion of the address of said given conditional branch instruction applied to a first input thereof from said instruction address register, and which has said at least a portion of the address of said given conditional branch instruction read out from said address and history table applied to a second input thereof, with said compare network having a MATCH output and a NO MATCH output, which provide a gating signal at the respective outputs when the address information applied to said first and second inputs does and does not match, respectively;

a combinational circuit to which said at least one history bit read out of said address and history table is applied, with said combinational circuit providing a one bit binary output signal which indicates that execution of said conditional branch instruction will result in a branch being taken or not taken when in a first binary state or a second binary state, respectively; and first means for indicating the probable outcome of said given conditional branch instruction based on the one binary output signal from said combinational circuit whenever there is a gating output signal provided at the MATCH output of said compare network.

2. The combination claimed in claim 1, including:

a history queue in which the said at least one history bit associated with the addresses of conditional branch instructions which have been successfully decoded but have not finished being executed are stored, with said at least one history bit read out of said address and history table being applied to the top of said history queue, and the bottom of said history queue containing said at least one history bit associated with the conditional branch instruction presently being executed; and a correction network to which said at least one history bit contained in the bottom of said history queue is applied, with the state of said at least one history bit remaining the same or changing state based on whether the previous branch probable outcome indication for the associated conditional branch instruction was correct or incorrect, respectively, with a corrected history bit being applied to said address and history table, concurrent with the match portion of the conditional branch instruction presently being executed being applied to said address and history table from the bottom of said address queue.

3. The combination claimed in claim 2, wherein said at least one bit history portion of said address and history table is n bits wide, where n is an integer $\geq 3$, and said combinational circuit comprises:

a majority logic network having said n bits applied to the inputs thereof, and providing a one bit binary output signal which is indicative of said given conditional branch instruction being taken or not taken when in one of first and second binary states, respectively, with said one bit binary output signal being in the first binary state when the majority of said n bits are in the first binary state and being in the second binary state at all other times.

4. The combination claimed in claim 1, including:

second means for indicating the probable outcome of said given conditional branch instruction based on the status of an externally supplied default branch guess signal whenever there is a gating output signal provided at the NO MATCH output of said compare network.

* * * * *